E. MAHLER.
BEATING ENGINE.
APPLICATION FILED JUNE 14, 1920.

1,378,046.

Patented May 17, 1921.
3 SHEETS—SHEET 1.

INVENTOR.
Ernst Mahler.
BY Morsell + Keeney
ATTORNEYS.

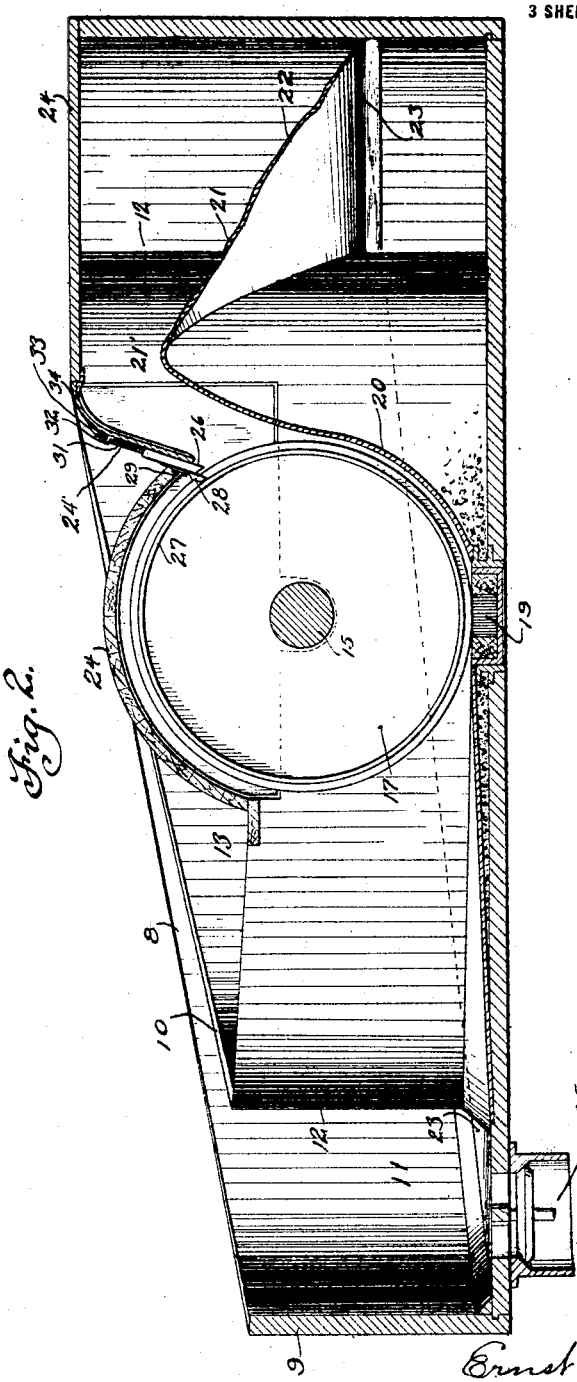

E. MAHLER.
BEATING ENGINE.
APPLICATION FILED JUNE 14, 1920.
1,378,046.
Patented May 17, 1921.
3 SHEETS—SHEET 3.
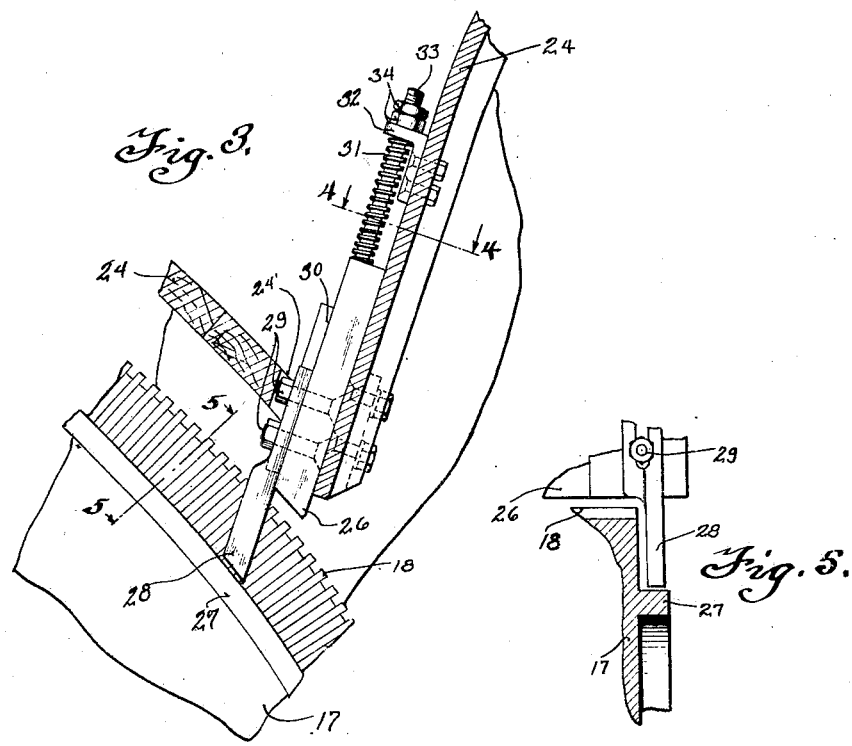
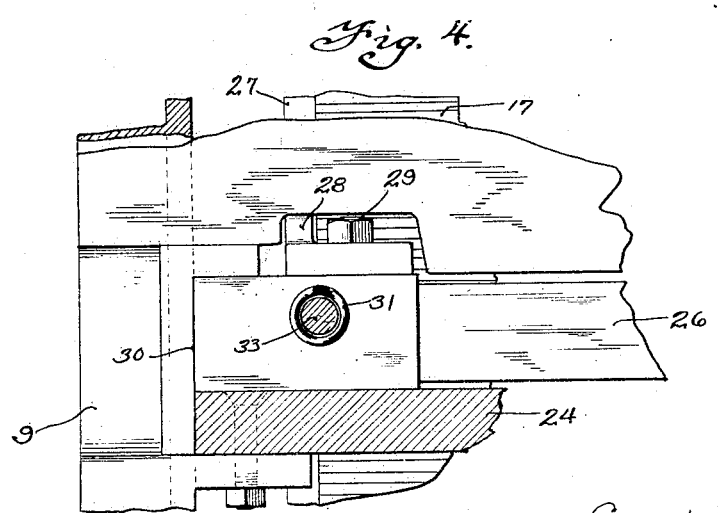
INVENTOR.
Ernst Mahler.
BY Morsell + Keeney.
ATTORNEYS.

UNITED STATES PATENT OFFICE.

ERNST MAHLER, OF NEENAH, WISCONSIN.

BEATING-ENGINE.

1,378,046.  Specification of Letters Patent.  Patented May 17, 1921.

Application filed June 14, 1920. Serial No. 388,952.

*To all whom it may concern:*

Be it known that I, ERNST MAHLER, a citizen of the United States, and resident of Neenah, in the county of Winnebago and State of Wisconsin, have invented new and useful Improvements in Beating-Engines, of which the following is a description, reference being had to the accompanying drawings, which are a part of this specification.

This invention relates to improvements in beating engines more particularly related to preparing stock in paper making.

In the paper making art the half or coarse pulp or other material is passed through a beating engine to be shredded or reduced to a finer pulp and in being worked, the material is mixed with water to form a semi-liquid mass which is ordinarily contained within an oval shaped partitioned vat provided with a rotary reducing member which extends transversely of the vat. The stock is caused to flow between the rotary reducing member, and a fixed coacting member positioned below the reducing member, and the reducing member is mounted on a shaft which extends through the side walls of the vat. The pulp is caused to move around the vat by the rotation of the rotary reducing member and an inclined back fall positioned adjacent the reducing member and extending to a height not greater than the axis of the rotary member. In the ordinary beater the pulp is of a 3½ or 4% consistency and it takes from twenty to twenty-five minutes to properly reduce the same.

In the ordinary construction the reducing member shaft extends entirely across the vat, and in the portion opposite to that occupied by the reducing member the shaft obstructs the flow of the pulp and requires means for preventing the pulp leaking through the opening in the wall of the vat through which the shaft extends.

Furthermore, a fixed scraper is ordinarily used for preventing the pulp from sticking to and traveling entirely around with the reducing member with the result that when the reducing member automatically raises to permit the passage of foreign matter between the rotary and the fixed reducing members, the scraper is ofttimes broken or damaged.

It is one of the objects of the invention to overcome the before mentioned objectionable features and provide a beating engine in which pulp of 8% consistency may be reduced in three to five minutes.

A further object of the invention is to provide a beating engine having a back fall of comparatively a considerable height and so shaped and angled as to increase the speed of travel of the pulp several times greater than the speed of travel of the pulp in ordinary beating engine vats.

A further object of the invention is to provide a beating engine with a scraping means which will move upwardly with the rotary reducing member and thus eliminate possibility of damage to the parts.

A further object of the invention is to provide a beating engine having an interior well or space to receive one end bearing of the rotary member and thus eliminate extending the shaft entirely across the vat.

A further object of the invention is to provide a beating engine having a floor or bottom portion of such angularity and a valved discharge opening so located as to permit the discharge of the reduced pulp or stock from the vat without the necessity of utilizing manual labor.

A further object of the invention is to provide a beating engine which is of simple construction, is strong and durable and is well adapted for the purpose described.

With the above and other objects in view the invention consists of the improved beating engine and its parts and combinations as set forth in the claims, and all equivalents thereof.

In the accompanying drawings in which the same reference characters indicate the same parts in all of the views:

Fig. 2 is a longitudinal sectional view of the vat portion of the beating engine taken on line 2—2 of Fig. 1;

Fig. 3 is a transverse sectional detail view of the scraper and adjacent parts shown on a larger scale;

Fig. 4 is a sectional detail view taken on a larger scale on line 4—4 of Fig. 3; and Fig. 5 is a sectional detail view taken on line 5—5 of Fig. 3.

Figure 1:
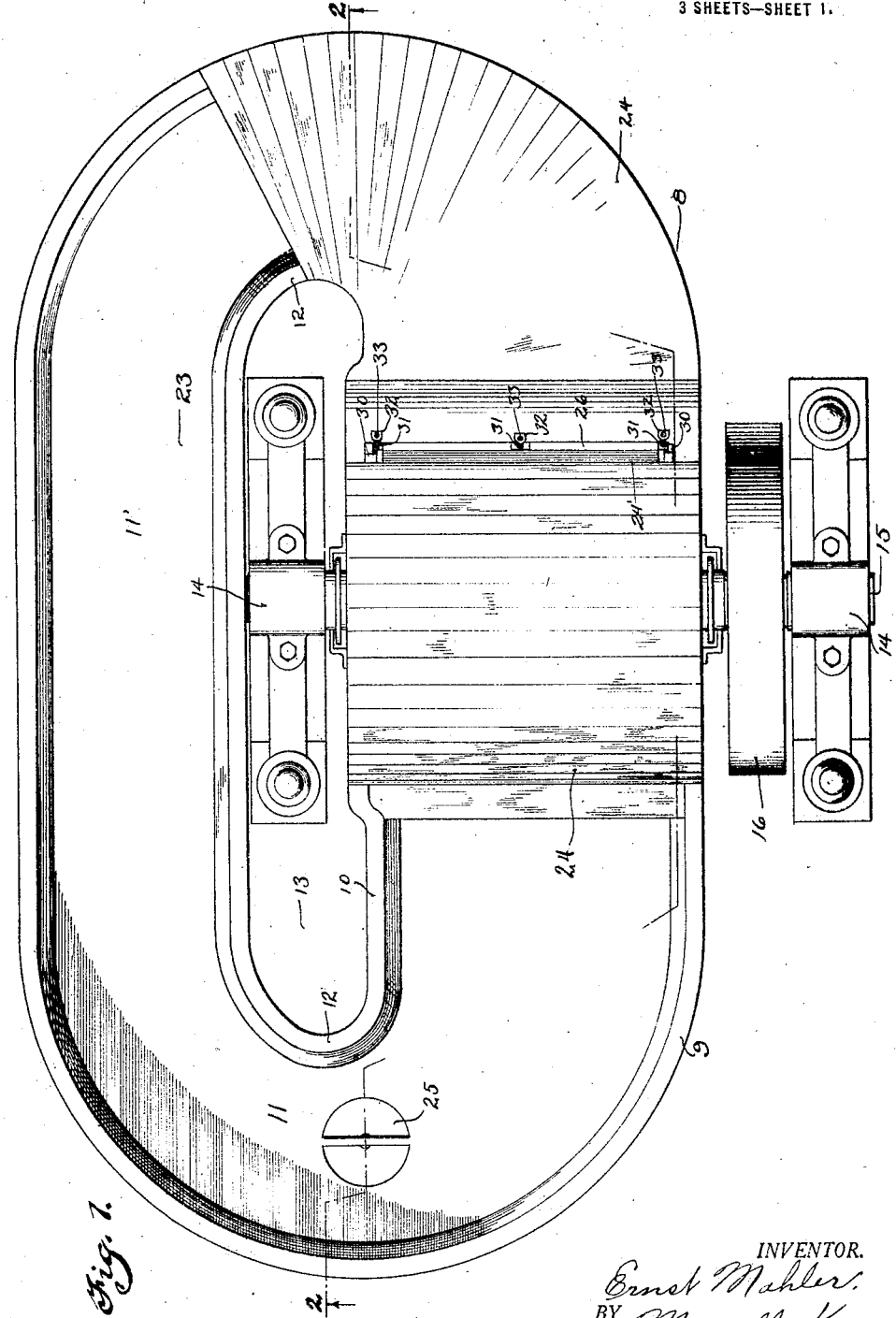
Figure 1 is a top view of the improved beating engine.

Referring to the drawings, the numeral 8 indicates a beating engine which comprises a vat 9 of oval shape divided medially of its width by a double midfeather or partition 10 which extends for a portion of the length of the vat, and is spaced from the end portions thereof to form a continuous passageway 11 for the stock to travel around the partition while being worked. The side portion 11' of the passageway is of less width than the other as it is unobstructed in any manner. The side portions of the double partition are joined together at their ends by rounded parts 12 to form an inclosed well or space 13 to accommodate one of the vertically yielding bearings 14 of the beater shaft 15. Said shaft 15 extends transversely through the upper portion of one side wall of the vat and through one side wall of the partition and is supported and journaled in the yielding bearings 14 of ordinary construction, before mentioned. One of the bearings 14 is positioned outside of and spaced from the side wall of the vat to permit mounting a belt wheel 16 on the shaft between the outside bearing and the vat wall, and the other bearing 14 is located within the well. A rotary reducing member or drum 17 mounted fast on the shaft and positioned within the side portion of the passageway of greatest width is provided with a series of peripheral longitudinally extending knife bars 18 which co-act with fixed knives 19 mounted in the bottom portion of the vat immediately beneath the drum. The drum 17 is of a length to extend substantially entirely across the passageway 11 so that all stock is compelled to pass between the drum and the fixed knives in its travel around the vat.

The front face 20 of the back fall 21 curves upwardly in a line concentric with relation to the drum and to a height corresponding approximately to the height of the axis of the drum and then extends tangentially with a slight outward curve to the apex 21' of the back fall. From the apex the back fall inclines downwardly and around the end of the midfeather at an acute angle as indicated by the numeral 22 and at its lower end gradually merges with the inclined bottom portion 23 to avoid retarding shoulders or angles. Particular attention is directed to the fact that in ordinary beating engines the back fall never extends above the plane of the axis of the drum whereas in the present invention the back fall extends to a point approximately as high as the upper periphery of the drum with the result that the drum is rotated at a higher speed than in ordinary constructions to carry the stock over the apex of the back fall, and the acute angle of the back fall combined with the gradual and unobstructed merging with the steep bottom portion of the passageway causes the stock to acquire an accelerated movement from the drum and to pass entirely around the passageway of the vat in from one-fourth to one-sixth the time required in the ordinary beating engine. A further gain is made due to the fact that stock may be reduced or comminuted which is of greater consistency than the stock reduced in ordinary beating engines.

An inclosing cover 24 having an elongated opening 24' rests upon the upper edge portion of the vat and the midfeather and extends over the drum and the back fall to prevent the stock from being splashed out of the vat by the beating drum.

A valved discharge opening 25 located at the lowest portion of the bottom provides for the convenient discharge of the comminuted stock without the necessity of using manual labor.

In order to prevent the stock from being carried around the drum, a scraper 26 is provided which extends longitudinally of the drum and is positioned on the ascending side thereof and close to the peripheral portion of the drum. As the drum is vertically yieldingly mounted to permit foreign matter to pass between the drum and the fixed knives, provision is also made for yieldingly mounting the scraper so it will move upwardly with the drum and always retain its relative position with relation thereto. To accomplish this result the drum at its opposite ends is provided with outwardly projecting annular ribs 27 and the opposite end portions of the scraper 26 is provided with downwardly extending arms 28 which are in radial alinement with the annular ribs 27 and terminate a short distance therefrom. The arms are slotted and bolts 29 adjustably connect them to the scraper and permit their adjustment with relation to the ribs.

The opposite end portions of the scraper are guided in grooved ways 30 mounted on the cover portion 24 of the engine. The scraper is yieldingly held in adjusted position by means of coiled springs 31 which are interposed between the scraper and brackets 32 mounted on the cover 24. Bolts 33 fastened in the upper portion of the scraper and extending through the springs and through the brackets have nuts 34 threaded on their upper end portions and adjustably hold the scraper in position and limit its downward movement while permitting the upward movement of the scraper when the arms are engaged by the annular ribs.

In use the stock is placed in the vat and the drum is rotated to pass it between the drum and the fixed knives to comminute the same. The rotation of the drum bears a certain relation to the speed of travel of the stock and the height and inclination of the back fall to prevent the stock piling up at any point and to assure a constant supply of stock to the action of the drum. As the drum rotates, the stock is worked between the drum and the fixed knives and is forced upwardly by centrifugal force and by the pressure of the stock following, over the upper edge of the back fall. The momentum of the movement of the stock imparted by the drum and the relatively high and acute angle of the back fall and the steep angle of the bottom will accelerate the movement of the stock and cause it to travel at relatively a high rate of speed so that the stock will be efficiently worked in from one-fourth to one-sixth of the time required in ordinary beating engines. While being worked, the scraper will remove the surplus stock from the drum, and if any foreign matter passing between the drum and the fixed knives should elevate the drum, the annular ribs of the drum will engage the scraper arms and force said scraper upwardly without damage. When the stock is properly worked it may be easily discharged from the vat by opening the valved discharge opening.

From the foregoing description, it will be seen that the beating engine is of very simple construction, and is well adapted for the purpose described.

What I claim as my invention is:

1. A beating engine, comprising a vat member having an inclined bottom portion, a midfeather positioned medially within the vat to form a circular passageway, a beating drum vertically yieldingly extending into the passageway between one side portion of the vat wall and the midfeather, a back fall positioned in the passageway adjacent the drum, the upper portion of said back fall extending in a plane higher than the axis of the drum to move the stock around the passageway at a high speed with relation to the speed of travel of stock in an ordinary beating engine, and a scraper vertically yieldingly positioned between the drum and the back fall for deflecting stock from the drum toward the upper portion of the back fall, said scraper moving vertically with the drum and retaining approximately its relative position with relation thereto.

2. A beating engine, comprising a vat member having comparatively a steep inclined bottom portion, a midfeather positioned medially within the vat to form a circular passageway, a beating drum vertically yieldingly extending into the passageway between one side portion of the vat wall and the midfeather, a back fall positioned in the passageway adjacent the drum, the upper portion of said back fall extending in a plane between horizontal lines drawn through the axis of the drum and the upper peripheral edge portion of the drum to move the stock within the vat around the passageway at a high speed with relation to the speed of travel of stock in an ordinary beating engine, and a scraper vertically yieldingly positioned between the drum and the back fall for deflecting stock from the drum toward the upper portion of the back fall, said scraper moving vertically with the drum and retaining approximately its relative position with relation thereto.

3. A beating engine, comprising a vat member having comparatively a steep inclined bottom portion, a midfeather positioned medially within the vat to form a circular passageway, a beating drum vertically yieldingly extending into the passageway between one side portion of the vat wall and the midfeather, a back fall positioned in the passageway adjacent the drum, the upper portion of said back fall extending in a plane between horizontal lines drawn through the axis of the drum and the upper peripheral edge portion of the drum to move the stock within the vat around the passageway at a high speed with relation to the speed of travel of stock in an ordinary beating engine, a cover extending over the drum and the back fall and having an elongated opening and grooved ways adjacent thereto, a scraper extending into the grooved ways and through the elongated opening and terminating close to the periphery of the drum, said drum having annular ribs formed on its opposite ends, arms connected to the scraper and extending to positions to be engaged by the ribs, and means yieldingly holding the scraper in its inner position.

4. A beating engine, comprising a vat member having an inclined floor portion, a double wall midfeather positioned medially within the vat and forming a well with a surrounding passageway, a relatively high back fall extending transversely across the passageway between one of the midfeather walls and the vat wall, a bearing positioned within the well, a bearing positioned outside of the vat, a shaft journaled in the bearings, a beating drum mounted on the shaft and extending into the passageway adjacent the back fall, and a scraper yieldingly mounted between the drum and the back fall for deflecting stock from the drum toward the back fall.

5. A beating engine in part, comprising a beating drum having annular ribs located at its opposite ends, a scraper adjacent the drum and having arms positioned to ride upon the ribs, means for limiting the movement of the scraper toward the drum, and means for yieldingly holding the scraper in its close-to-the-drum position.

6. A beating engine in part, comprising a beating drum having annular ribs located at its opposite ends, a scraper adjacent the drum, arms adjustably connected to the scraper and extending to positions to ride upon the ribs when the drum moves upwardly, bolts extending upwardly from the scraper and having bolts threaded on their upper ends, bearings through which the bolts slidably extend, and coiled springs surrounding the bolts and interposed between the scraper and the bearings.

7. A beating engine, comprising a vat member having a double wall midfeather with rounded end portions to form a well within the vat and a stock passageway around the well, said passageway being of greater width on one side of the well than on the other, the bottom portion of the narrow part and one end part of the passageway being steeply inclined downwardly and free from obstruction to the free passage of stock therethrough, a bearing positioned within the well and another bearing positioned outside of the vat, a shaft journaled in said bearings and extending across the portion of the passageway of greater width, and terminating at the bearing in the well to eliminate obstructing the passage of stock in the passageway of less width, a beating drum mounted on the shaft between the bearings and extending into the passageway of greater width, and a back fall positioned within the portion of the passageway of greater width and extending upwardly to a plane at least within a distance of one fifth of the diameter of the drum from the upper periphery of the drum and having one of its walls extending downwardly away from the drum at a steep incline and merging with the inclined bottom of the passageway to move stock around the passageway at comparatively a high rate of speed with relation to the speed of travel of stock in any ordinary beating engine.

8. A beating engine, comprising a vat member of oval form with straight side portions and a steeply inclined bottom portion, a double wall midfeather positioned within the vat member and having straight side portions and rounded ends, said midfeather positioned closer to one side of the vat than the other and forming an endless passageway of greater width on one side than the other, a beating drum extending into the portion of the passageway of greatest width and having its bearings on opposite sides of said wide portion of the passageway, one of said bearings being within the midfeather and the drum shaft terminating at said last mentioned bearing to eliminate obstruction in the passageway of less width and thereby permit free and rapid passage of stock therethrough, and a comparatively high back fall within the vat adjacent the drum, the upper edge portion of said back fall extending to a plane at least within a distance of one fifth of the diameter of the drum from the upper periphery of the drum, the lower portion of said back fall merging with the bottom portion to move the stock around the passageway at a comparatively high rate of speed with relation to the speed of travel of stock in an ordinary beating engine.

9. A beating engine, comprising a vat member having straight sides and curved ends, a double wall midfeather positioned in the vat and having straight sides and curved ends and forming a well within the vat, said midfeather positioned closer to one side of the vat than to the other and forming an endless passageway of greater width on one side than the other, the side portions of the vat and the midfeather being substantially parallel and the end portions thereof gradually tapering from the portion of the passageway of less width to the portion of greater width, a bearing positioned within the well and another bearing positioned outside of the well, a shaft journaled in said bearings and terminating at the well bearing, a beating drum mounted on the shaft and extending into the passageway, a back fall positioned in the passageway and having a curved side wall adjacent the drum, and its opposite side wall inclined downwardly at a steep incline in the direction of travel of the stock, said back fall extending upwardly to a plane at least within a distance of one fifth of the diameter of the drum from the upper periphery of the drum, the bottom portion of the passageway being inclined downwardly from the lower portion of the midfeather around the adjacent end portion of the passageway to the opposite end thereof at an abnormally steep incline to move the stock at a comparatively high rate of speed with relation to the speed of travel of stock in an ordinary beating engine, a cover extending over and spaced from the back fall to permit the free passage of stock between the cover and the upper portion of the back fall, and a scraper movable vertically for deflecting material from the drum toward the back fall.

10. A beating engine, comprising a vat member having a steeply inclined floor portion, a double wall midfeather positioned medially within the vat and forming a well with a surrounding passageway, a relatively high back fall extending transversely across the passageway between one of the midfeather walls and the vat wall, a bearing positioned within the well, a bearing positioned outside of the vat, a shaft journaled in the bearings, and terminating at the well bearing to eliminate obstructing the passage of stock in the passageway, a beating drum mounted on the shaft and extending into the passageway adjacent the back fall, the upper edge portion of said back fall extending to a plane at least within a distance of one fifth of the diameter of the drum to the upper periphery of the drum, and a scraper yieldingly engaging the drum and movable therewith vertically for deflecting stock therefrom toward the back fall.

In testimony whereof I affix my signature.

ERNST MAHLER.